Sept. 7, 1948.　　　　B. O. RICHARD　　　　2,448,738
CHUCK OR WORKHOLDER

Filed July 9, 1945　　　　　　　　　　　　　3 Sheets—Sheet 1

INVENTOR.
Bernard O. Richard
BY
Barnes, Kisselle, Laughlin & Raisch
Attorneys

Sept. 7, 1948.  B. O. RICHARD  2,448,738
CHUCK OR WORKHOLDER
Filed July 9, 1945  3 Sheets-Sheet 2
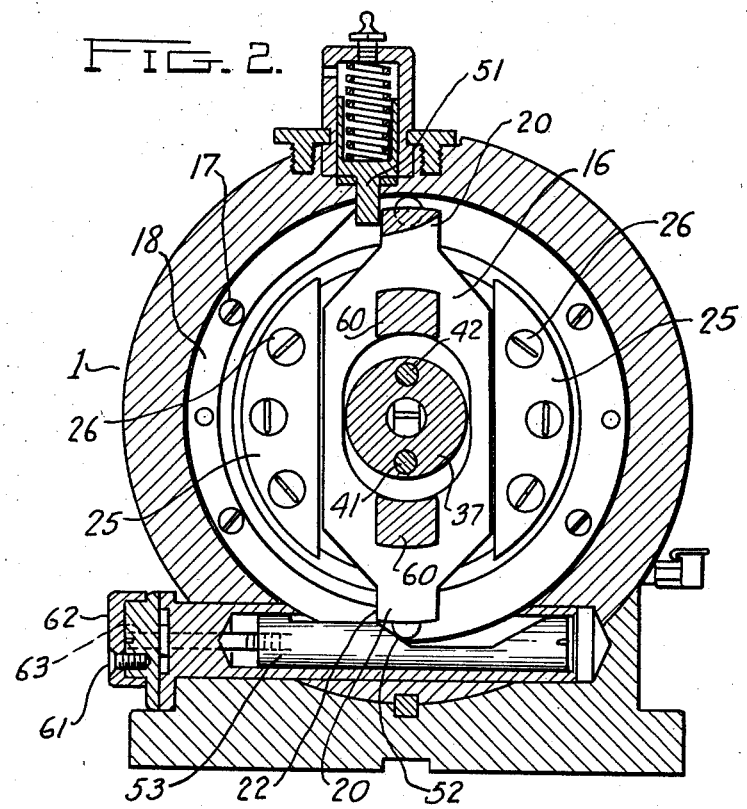
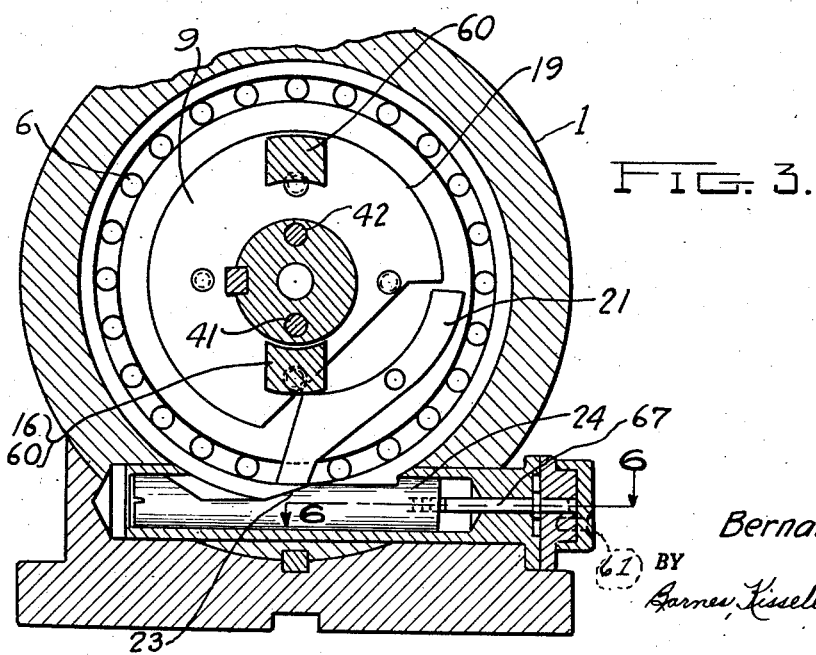
INVENTOR.
Bernard O. Richard Sept. 7, 1948. B. O. RICHARD 2,448,738
CHUCK OR WORKHOLDER
Filed July 9, 1945 3 Sheets-Sheet 3
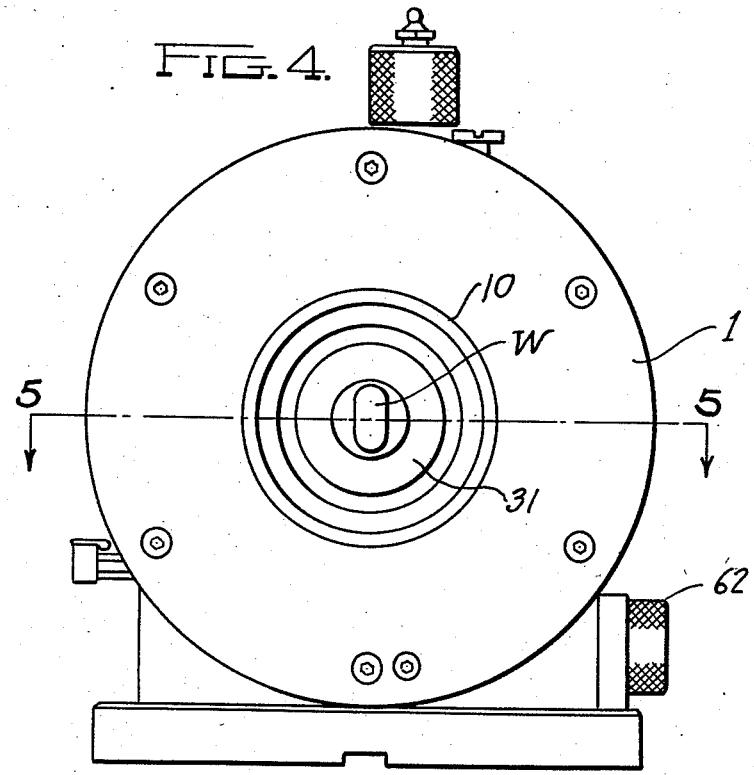
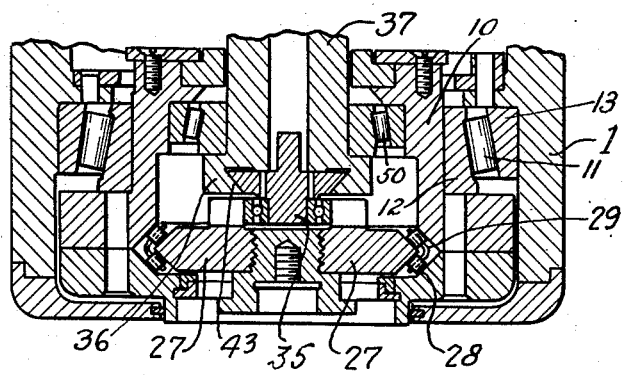
INVENTOR.
Bernard O. Richard
BY
Barnes, Kisselle, Laughlin & Raisch
Attorneys Patented Sept. 7, 1948

2,448,738

UNITED STATES PATENT OFFICE 2,448,738

CHUCK OR WORK HOLDER

Bernard O. Richard, Hillsdale, Mich., assignor to Allied Products Corporation, Detroit, Mich., a corporation of Michigan Application July 9, 1945, Serial No. 603,757

12 Claims. (Cl. 82—40)

This invention relates to a chuck which I call an "Oblomatic Chuck," for the reason that the chuck is adapted for holding work which is given an oblong or an elliptical shape in cross section. Many tools, such as punches for making slots, are oblong or elliptical in cross section and these tools require a special work holder to present the work to a lathe or grinding machine. They require the work to be given both a turning movement and also a transverse or diametric movement in order to cut or grind the surfaces of such a tool. A work holding head for such a purpose is shown and described in the patent to Clarence A. Richard No. 1,687,143, dated October 9, 1928.

The present invention is intended to provide an improved chuck for doing the same work that is done in the work holding head of the Richard patent. The improved apparatus has greater compactness, superior bearing arrangement and the cam release adjustments are all external and the machine has a roller bearing work slide. In the apparatus of the Richard patent it is necessary to dismantle the chuck and re-adjust the various members in the assembly in order to get the desired adjustment.

Referring to the drawings:

Fig. 2 is a section on the line 2—2 of Fig. 1.

Figure 1:
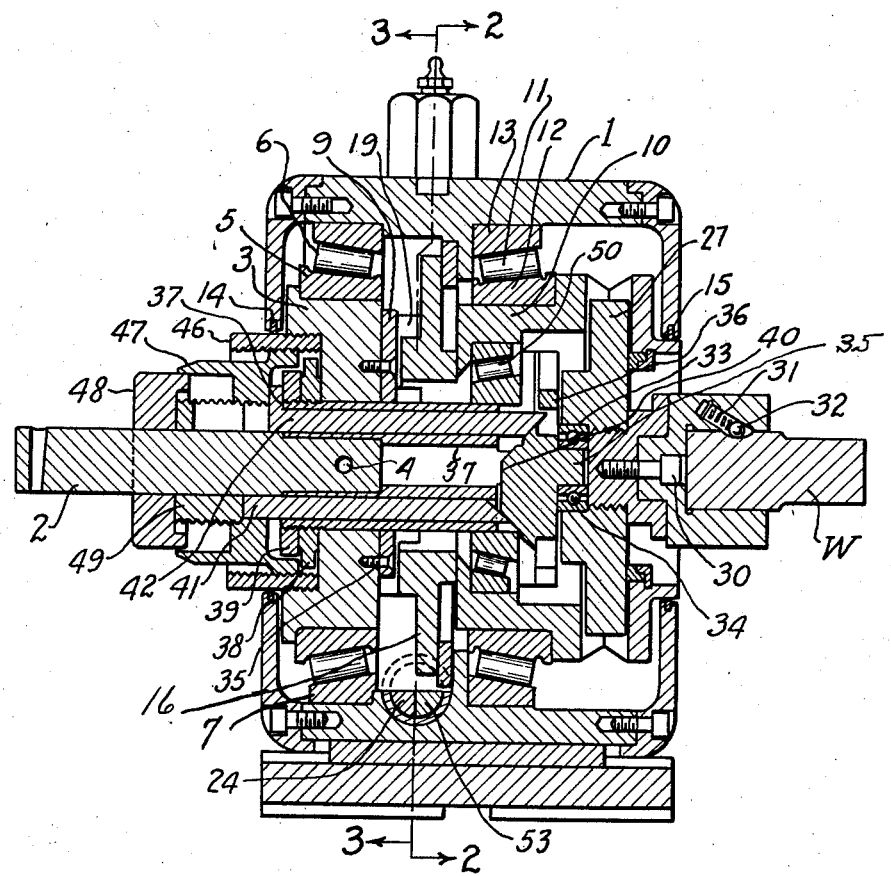
Fig. 1 is a longitudinal section of the chuck.

Fig. 3 is a section on the line 3—3 of Fig. 1, but after the slide 16 has been raised by the releasing dog 21.

Fig. 4 is a front elevation of the chuck.

Fig. 5 is a section on the line 5—5 of Fig. 4.

Figure 6:
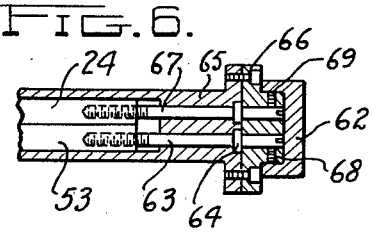

Fig. 6 is a section on the line 6—6 of Fig. 3.

Figure 7:
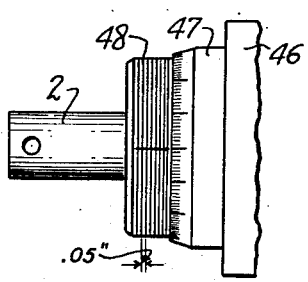

Fig. 7 is a top elevation of the rear part of the chuck.

The housing is designated 1. 2 is the rotating driving shaft which is pinned to the driving sleeve 37 by pin 4. A bearing ring 5 fits tightly on the driving head 3, and the roller bearings 6 support this bearing ring and rotating head on the bearing ring 7, which is supported in the housing 1. A driving plate 9 is fastened to the driving head by screws and this plate 9 has a boss 19 in the form of a raised arcuate part. 10 is the driven head which is mounted rotatably in the housing by means of the roller bearings 11 and the bearing rings 12 and 13. The driving head has an oil seal 14 in the housing and the driven head has an oil seal 15 in the housing. 16 designates a cam-operated slide which alternately serves to key the driving and driven heads together for rotation together and to release these two heads and lock the driven head to the housing so that the driven head cannot rotate. This will be explained presently.

The housing has bolted thereto by screws 17 a segment 18 which cooperates with the locking slide 16 to arrest the movement of the driven head. The driving plate 9 is provided with one forwardly or axially projecting driving shoulder or boss 19. Two radially projecting lugs 20 are provided on slide 16. Pivoted on the driving head is a releasing dog 21 (Fig. 3). When the driving head has turned half a turn after the slide has been stopped by stop 22 on segment 18 (Fig. 2), the dog 21 is in the position shown in Fig. 3. The outer end of the dog has engaged the surface 23 of adjustable cam 24. This has swung the end of the dog inwardly and caused it to engage one of the driving shoulders 60 on the slide 16. This has shifted the slide diametrically (Fig. 3) so as to release the lug 20 that is locked behind stop 22 (Fig. 2). This has brought the opposite driving shoulder 60 up ahead of the driving shoulder 19 of the driving plate 9 so that now the slide is rotated by the driving head. The slide slides between the arcuate plates 25 (Fig. 2) that are bolted onto the driven head by screws 26. The driving and driven heads now rotate together on the roller bearings which support these two heads in the housing.

A work carrying slide 27 is supported by the roller bearings 28 mounted in retainer 29 in the driven head (Fig. 5). This work carrying slide has bolted thereto by bolt 30 a work holding sleeve 31 in which may be gripped or locked a work piece W by means of the ball chuck or punch retainer 32, described and claimed in the patent to Otis K. Richard et al. No. 1,621,811. The work carrying slide 27 is provided with a recess 33 in which is seated the ball bearing set 34 which supports the eccentric 35. This eccentric is slidably mounted in the annular flange or collar 36 on the end of the driving sleeve 37 (Fig. 5) which is fastened to the driving head by the jamb nut 38 and lock nut 39. This annular flange has a diametric dovetail slot 43 (Fig. 5) in which the eccentric 35 (Fig. 1) is adapted to travel.

The inner end of the eccentric 35 is provided with an angular head 40 against which bear the chamfered ends of the adjusting rods 41 and 42. These rods are adjusted longitudinally by means of a micrometer set of adjusting sleeves which will be described later. As shown in Fig. 1, the eccentric is here not in eccentric position but is directly on the centerline of the shaft so with this adjustment the work would not move transversely. However, as the rod 42 is pushed forwardly, rod 41 will be pushed rearwardly and the eccentric member 35 will be pushed to an eccentric position. The amount of eccentricity is controlled by the position of the adjusting rods and the amount of eccentricity determines the amount of transverse or diametric travel of the work holding sleeve 31.

46 is a jamb nut which has a left-hand thread on the O. D. By turning to the right, this member is loosened. A micrometer sleeve 47 has a right-hand thread both on the I. D. and O. D. The external thread is twenty pitch and the internal thread is ten pitch. Member 48 is fixed by clamping to shaft 2 and is calibrated by lines spaced at .050 intervals along its length. By turning the micrometer sleeve 47 which is calibrated by marking 100 equal divisions around its circumference and which are set to an index line marked axially on 48 to the left or counterclockwise the micrometer sleeve moves outwardly fifty calibrated 1000ths per revolution, at the same time forcing the sliding nut 49 which is splined in member 48 which is clamped to shaft 2 in such a manner that nut 49 is slidable inwardly at the rate of one hundred 1000ths per revolution. But inasmuch as the micrometer sleeve is going outwardly at fifty 1000ths per revolution, sliding nut 49 only goes inwardly along the driving shaft 2 at the rate of fifty 1000ths per revolution. After the desired amount of adjustment has taken place the jamb nut 46 may be turned to the left to hold the adjustment. This locks the nut 49 and the micrometer sleeve 47 against the inner ends of the adjusting rods 41 and 42 and these, bearing with their chamfered outer ends against the angular head of the eccentric 35, fix the amount of eccentricity of the eccentric and, consequently, fix the transverse travel of the work head.

It will be noted that the driven head 10 is mounted in the housing 1 by roller bearing 11 and on the outside of the driving head by roller bearing 50.

The operation is as follows: With the parts as shown in Fig. 2, the slide 16 is locked by stop 22 against rotation in one direction and by the locking plunger 51 against rotation in the opposite direction. Consequently, the driven head can move in neither direction, but the driving head together with the eccentric can rotate and cause the work carrying slide 27 to move transversely or diametrically, by reason of the slide being held against rotative movement in the driven head, but capable of sliding movement diametrically by reason of the roller bearing mountings 28 and 29 (Fig. 5). Consequently, as the driving shaft continues to rotate, the slide 27 for one half turn of the driving shaft will travel diametrically or transversely, if the eccentric 35 is adjusted to a position off the center of the shaft 2. When the shaft and driving head have rotated substantially 180°, dog 21 strikes the cam face 23 of cam 24, as shown in Fig. 3. This swings the outer end of the dog upwardly into contact with one of the lugs or bosses 60 of slide 16 raising the lug 20 out of contact (as shown in Fig. 2) with shoulder 22 of the stationary housing and bringing the opposite lug 60 in position to be encountered by the boss 19 on the driving plate 9 (see Fig. 3). The driving head and the driven head now rotate together for 180°, whereupon one lug 20 (Fig. 2) engages the cam face 52 of cam 53 which is adjustable independently of cam 24 (see Fig. 6) and this causes the slide 16 to be raised releasing lug 19 from boss 60 and forcing the locking plunger 51 upwardly, and then as the opposite lug 20 reaches shoulder 22 on segment 18, the locking plunger 51 snaps behind the other lug 20 and the slide, together with the driven head, is locked against movement in either direction. Thereupon, the driving head and annular flange 36 rotate, carrying eccentric 35 which, being off center, causes the slide 27 to move in a transverse or diametric direction. By reason of alternate rotative and transverse movements of slide 27 the flat surfaces are alternately presented to the cutting or grinding tool.

The amount of throw or transverse movement of slide 27 is determined by how far eccentric 35 is off the center of shaft 2. This adjustment is made by loosening jamb nut 46. Then, as already explained, micrometer sleeve 47 can be turned either to the right or left. This will advance or draw back the micrometer sleeve fifty 1000ths for each turn and it will cause the sliding nut 49 to go in the opposite direction fifty 1000ths for each turn of the sleeve. The consequence is, as one adjusting rod 41 moves in one direction, the other adjusting rod 42 moves an equal distance in the opposite direction, and the chamfered ends of these adjusting rods bearing on the angular head of the eccentric forces the eccentric off center depending upon the amount of adjustment of the micrometer sleeve. When the adjustment has been made the jamb nut 46 is tightened in the driving head and this establishes and maintains this adjustment.

The exact timing of the transverse movement by reason of the slide 16 encountering the cam 52 (Fig. 2) can be adjusted from the outside of the chuck by means of loosening screw 61, taking off cap 62 and then, after releasing set screw 68, turning with a screw driver the screw 63. The screw 63 (Fig. 6) has an enlarged collar 64 which rotatively mounts the screw between the casing 65 and the casing cap 66. The screw 63 is threaded into the cam slide 53. Likewise, in the release of the slide 16 from the locked relation with the housing, the cam 24 may be adjusted in the same way by the similar screw 67 after releasing set screw 69. These cams adjustable from the outside of the chuck are a substantial improvement over the chuck described in the prior Patent No. 1,687,143 which, in order to get a different timing, required the dismantling of the chuck and the reworking or replacing of some of the members inside the chuck as the cam rings are neither adjustable nor accessible from the outside of the chuck.

I claim:

1. In a chuck or work holder for holding work for machining or grinding non-circular shapes, the combination of a stationary housing, a driving head and a driven head mounted to rotate in said housing, a work holding slide arranged to travel back and forth diametrically and periodically in said driven head, a second slide mounted in the driven head and arranged to slide back and forth diametrically in said head to alternately lock the driven head to the stationary housing and then to the driving head and means for causing such alternate sliding movements of said second slide to effect these purposes.

2. In a chuck or work holder for holding work for machining or grinding non-circular shapes, the combination of a stationary housing, a driving head having a projection and a driven head mounted to rotate in said housing, a work holding slide arranged to travel back and forth diametrically and periodically in said driven head, a second slide mounted in the driven head and arranged to travel back and forth diametrically in said head to alternately lock the driven head to the stationary housing and then to the driving head and means for causing such alternate movements of said second slide to effect these purposes comprising a shoulder on the stationary housing cooperating with a part on the slide to hold the said second slide and the driven head against rotative movement, a cam connected with the stationary housing and a releasing dog carried on the driving head for contacting the said cam and then a portion of the said second slide to release the same from said shoulder and drive the same slide into the path of the projection on the driving member to key the driving and driven heads together.

3. In a chuck or work holder for holding work for machining or grinding non-circular shapes, the combination of a stationary housing, a driving head and a driven head mounted to rotate in said housing, a work holding slide arranged to travel back and forth diametrically and periodically in said driven head, a second slide mounted in the driven head and arranged to travel back an forth diametrically in head to alternately lock the driven head to the stationary housing and then to the driving head and means for causing such alternate movements of said second slide to effect these purposes including a shoulder on the stationary housing arranged to contact the second slide to arrest the same and stop the driven member, a spring-pressed stop in the housing for snapping behind the second slide for preventing movement of the second slide and the driven member in the opposite direction.

4. In a chuck or work holder for holding work for machining or grinding non-circular shapes, the combination of a stationary housing, a driving head and a driven head mounted to rotate in said housing, a work holding slide arranged to travel back and forth diametrically and periodically in said driven head, a second slide mounted in the driven head and arranged to travel back and forth diametrically in said head to alternately lock the driven head to the stationary housing and then to the driving head and means for causing such alternate movements of said second slide to effect these purposes including a shoulder on the stationary housing arranged to contact the second slide to arrest the same and stop the driven member, a spring-pressed stop in the housing for snapping behind the said second slide for preventing movement of the second slide and the driven member in the opposite direction and a cam on the stationary housing arranged to cause transverse movement of the second slide while the same is also rotating to displace the spring-pressed stop temporarily while the stop later snaps behind the said second slide to prevent reverse rotation of the second slide and the driven member.

5. In a chuck or work holder for holding work for machining or grinding non-circular shapes, the combination of a stationary housing, a driving head and a driven head mounted to rotate in said housing, a work holding slide arranged to travel back and forth diametrically and periodically in said driven head, a second slide mounted in the driven head and arranged to travel back and forth diametrically in said head to alternately lock the driven head to the stationary housing and then to the driving head and means for causing such alternate movements of said second slide to effect these purposes including a pair of adjustable cams, one of which causes the second slide to move transversely while it is also rotating and a spring-pressed stop that is temporarily displaced by said second slide movement to snap behind the second slide and a shoulder on the stationary member which arrests the second slide and driven member at the same time the spring-pressed stop snaps behind the second slide and a movable member on the driving head cooperating with the other adjustable cam to cause transverse movement of the second slide to release the same from the said shoulder after an appointed rotation of the driving head.

6. In a chuck or work holder for holding work for machining or grinding non-circular shapes, the combination of a stationary housing, a driving head mounted to rotate therein, a driven head mounted to rotate in said housing, a work holding slide arranged to travel back and forth diametrically and periodically in said driven head, means arranged to alternately lock the driven head to the stationary housing and then to the driving head, means for causing said diametrical travel of the slide comprising an eccentric adjustably related to the center of the driving head and means passing longitudinally through the driving head and movable longitudinally thereof to adjust the eccentricity of said eccentric.

7. In a chuck or work holder for holding work for machining or grinding non-circular shapes, the combination of a stationary housing, a driving head mounted to rotate therein, a driven head mounted to rotate in said housing, a work holding slide arranged to travel back and forth diametrically and periodically in said driven head, means arranged to alternately lock the driven head to the stationary housing and then to the driving head, means for causing said diametrical travel of the slide comprising an eccentric adjustably related to the center of the driving head, means passing longitudinally through the driving head and movable longitudinally thereof to adjust the eccentricity of said eccentric comprising a trackway diametrically of the driving head in which the eccentric can slide, an angular head on the rear of the eccentric, adjustable rods passing longitudinally through the driving head having their ends bearing against the conical head of the eccentric to slidably adjust the eccentric in said trackway and means for adjusting said rods.

8. In a chuck or work holder for holding work for machining or grinding non-circular shapes, the combination of a stationary housing, a driving head mounted to rotate therein, a driven head mounted to rotate in said housing, a work holding slide arranged to travel back and forth diametrically and periodically in said driven head, means arranged to alternately lock the driven head to the stationary housing and then to the driving head, means for causing said diametrical travel of the slide comprising an eccentric adjustably related to the center of the driving head, means passing longitudinally through the driving head and movable longitudinally thereof to adjust the eccentricity of said eccentric comprising a trackway diametrically of the driving head in which the eccentric can slide, an angular head on the rear of the eccentric, adjustable rods passing longitudinally through the driving head having their ends bearing against the conical head of the eccentric to slidably adjust the eccentric in said trackway and means for adjusting said rods comprising a member having internal threads of a defined pitch, a slidable nut having external threads of half the pitch of the last-mentioned threads and a micrometer sleeve having complementary external threads engaging the internal threads of said member and complementary internal threads engaging the threads of the nut, the said micrometer sleeve and the nut arranged to abut the inner ends of the adjusting rods whereby when the micrometer sleeve travels in one direction the slidable nut travels in the opposite direction the same distance to give the proper travel to the eccentric head and eccentric.

9. In a chuck or work holder for holding work for machining or grinding non-circular shapes, the combination of a stationary housing, a driving head and a driven head mounted to rotate in said housing, a work holding slide arranged to travel back and forth diametrically and periodically in said driven head, a second slide mounted in the driven head and arranged to slide back and forth diametrically in said head to alternately lock the driven head to the stationary housing and then to the driving head and means for causing such alternate sliding movements of said second slide to effect these purposes including cam means accessible for adjustment from the outside of the chuck.

10. In a chuck or work holder for holding work for machining or grinding non-circular shapes, the combination of a stationary housing, a driving head and a driven head mounted to rotate in said housing, a work holding slide arranged to travel back and forth diametrically and periodically in said driven head, a second slide mounted in the driven head and arranged to slide back and forth diametrically in said head to alternately lock the driven head to the stationary housing and then to the driving head and means for causing such alternate sliding movements of said second slide to effect these purposes including a pair of cams slidable and adjustable from the outside of the chuck to alter the timing of the said locking actions.

11. In a chuck or work holder for holding work for machining or grinding non-circular shapes, the combination of a stationary housing, a driving head and a driven head mounted to rotate in said housing, a work holding slide arranged to travel back and forth diametrically and periodically in said driven head, a member mounted in the driven head and arranged to slide back and forth diametrically in said head to alternately lock the driven head to the stationary housing and then to the driving head and means for causing such alternate sliding movements of said member to effect these purposes including cam means accessible for adjustment from the outside of the chuck.

12. In a chuck or work holder for holding work for machining or grinding non-circular shapes, the combination of a stationary housing, a driving head mounted to rotate therein, a driven head mounted to rotate in said housing, a work holding slide arranged to travel back and forth diametrically and periodically in said driven head, means arranged to alternately lock the driven head to the stationary housing and then to the driving head, means for causing said diametrical travel of the slide comprising an eccentric adjustably related to the center of the driving head and a member fixed to the rotatable driving head, a micrometer sleeve rotatable with respect to said member, the said member and the micrometer sleeve provided with cooperating devices for moving means passing longitudinally through the driving head for adjusting the eccentricity of the said eccentric.

BERNARD O. RICHARD.

REFERENCES CITED

The following references are of record in the file of this patent:

UNITED STATES PATENTS

| Number | Name | Date |
|---|---|---|
| 1,256,131 | Hervig | Feb. 12, 1918 |
| 1,432,247 | Hervig | Oct. 17, 1922 |
| 1,687,143 | Richard | Oct. 9, 1928 |